US012657036B2

(12) United States Patent
Fong et al.

(10) Patent No.: US 12,657,036 B2
(45) Date of Patent: Jun. 16, 2026

(54) REMOTE CONFIGURATION OF BIOS SETTINGS

(71) Applicant: Hewlett-Packard Development Company, L.P., Spring, TX (US)

(72) Inventors: Chee Keat Fong, Spring, TX (US); Alexander Joseph Pienkawa Rosenbach, Spring, TX (US); Valiuddin Ali, Spring, TX (US); Jeffrey Kevin Jeansonne, Spring, TX (US); Richard Alden Bramley, Jr., Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 26 days.

(21) Appl. No.: 18/560,888

(22) PCT Filed: Jul. 16, 2021

(86) PCT No.: PCT/US2021/042019
§ 371 (c)(1),
(2) Date: Nov. 14, 2023

(87) PCT Pub. No.: WO2023/287434
PCT Pub. Date: Jan. 19, 2023

(65) Prior Publication Data
US 2024/0248729 A1      Jul. 25, 2024

(51) Int. Cl.
*G06F 9/4401* (2018.01)

(52) U.S. Cl.
CPC ................................. *G06F 9/4416* (2013.01)

(58) Field of Classification Search
CPC ..................................................... G06F 9/4416
See application file for complete search history.

(56) References Cited

U.S. PATENT DOCUMENTS

| 8,438,618 | B2 | 5/2013 | Eldar et al. |
| 8,904,162 | B2 | 12/2014 | Futral et al. |
| 9,450,951 | B2 | 9/2016 | Nedeltchev et al. |
| 9,742,766 | B2 | 8/2017 | Bhatnagar |
| 2006/0143600 | A1* | 6/2006 | Cottrell ................. G06F 21/572 |
| | | | 717/168 |
| 2009/0210689 | A1* | 8/2009 | Harmer ............... G06F 9/44505 |
| | | | 713/1 |

(Continued)

*Primary Examiner* — Nimesh G Patel
(74) *Attorney, Agent, or Firm* — Quarles & Brady LLP

(57)     ABSTRACT

According to aspects of the present disclosure, there is provided a non-transitory computer-readable storage medium comprising instructions that when executed cause a processor of a computing device to: send, to a remote device and via a first message queue on a cloud messaging service, a current Basic Input/Output System (BIOS) setting value; receive, from the remote device and via a second message queue on a cloud messaging service, an updated BIOS setting value and a cryptographic value; decrypt an encrypted private key of a public-private key pair stored in a memory of the computing device using the cryptographic value, wherein the public key of the public-private key pair is associated with a BIOS of the computing device; sign the updated BIOS setting value using the decrypted private key; provide the signed BIOS setting value to the BIOS of the computing device.

8 Claims, 12 Drawing Sheets

(56)            References Cited

U.S. PATENT DOCUMENTS

| | | | |
|---|---|---|---|
| 2015/0154092 A1* | 6/2015 | Chen | G06F 9/4401 |
| | | | 713/2 |
| 2017/0104591 A1 | 4/2017 | Merdinger et al. | |
| 2018/0075242 A1 | 3/2018 | Khatri et al. | |
| 2018/0254898 A1* | 9/2018 | Sprague | H04L 9/0637 |
| 2018/0276000 A1* | 9/2018 | Roszak | G06F 9/4401 |
| 2018/0343238 A1 | 11/2018 | Tola | |
| 2019/0303578 A1* | 10/2019 | Robison | G06F 21/572 |
| 2021/0058476 A1* | 2/2021 | Jensen | G06F 8/60 |
| 2022/0067161 A1* | 3/2022 | Hayes | H04L 63/061 |
| 2022/0326930 A1* | 10/2022 | Nandavar | H04L 67/1097 |

* cited by examiner

900

902 — Send current BIOS setting value to remote device

904 — Receive updated BIOS setting value and cryptographic value from remote device 906 — Decrypt private key using cryptographic value 908 — Sign updated BIOS setting value using decrypted private key 910 — Send signed BIOS setting value to BIOS

1000

1002 — Store private key on mobile device

1004 — Receive current BIOS setting value from computing device

1006 — Generate modified BIOS setting value

1008 — User identity verified?     N

Y

1010 — Sign updated BIOS setting value using private key

1012 — Send signed BIOS setting value to computing device

1100

1102  Create first message queue

1104  Create second message queue

1106  Subscribe to second message queue

1108  Indicate first and second message queue URLs to remote device

1110  Receive registration information

1112  Send acknowledgement

1114  Send current BIOS setting value to remote device

REMOTE CONFIGURATION OF BIOS SETTINGS

BACKGROUND

Computing devices, such as desktop computers, notebook computers, tablet computers, and smartphones may be provided with a basic input/output system (BIOS). Functionality of the BIOS may be configurable according to one or more BIOS settings to allow a user or administrator of the computing device to selectively control the functionality of the BIOS.

BRIEF INTRODUCTION OF THE DRAWINGS

Examples of the disclosure are further described hereinafter with reference to the accompanying drawings, in which.

DETAILED DESCRIPTION

Figure 1:
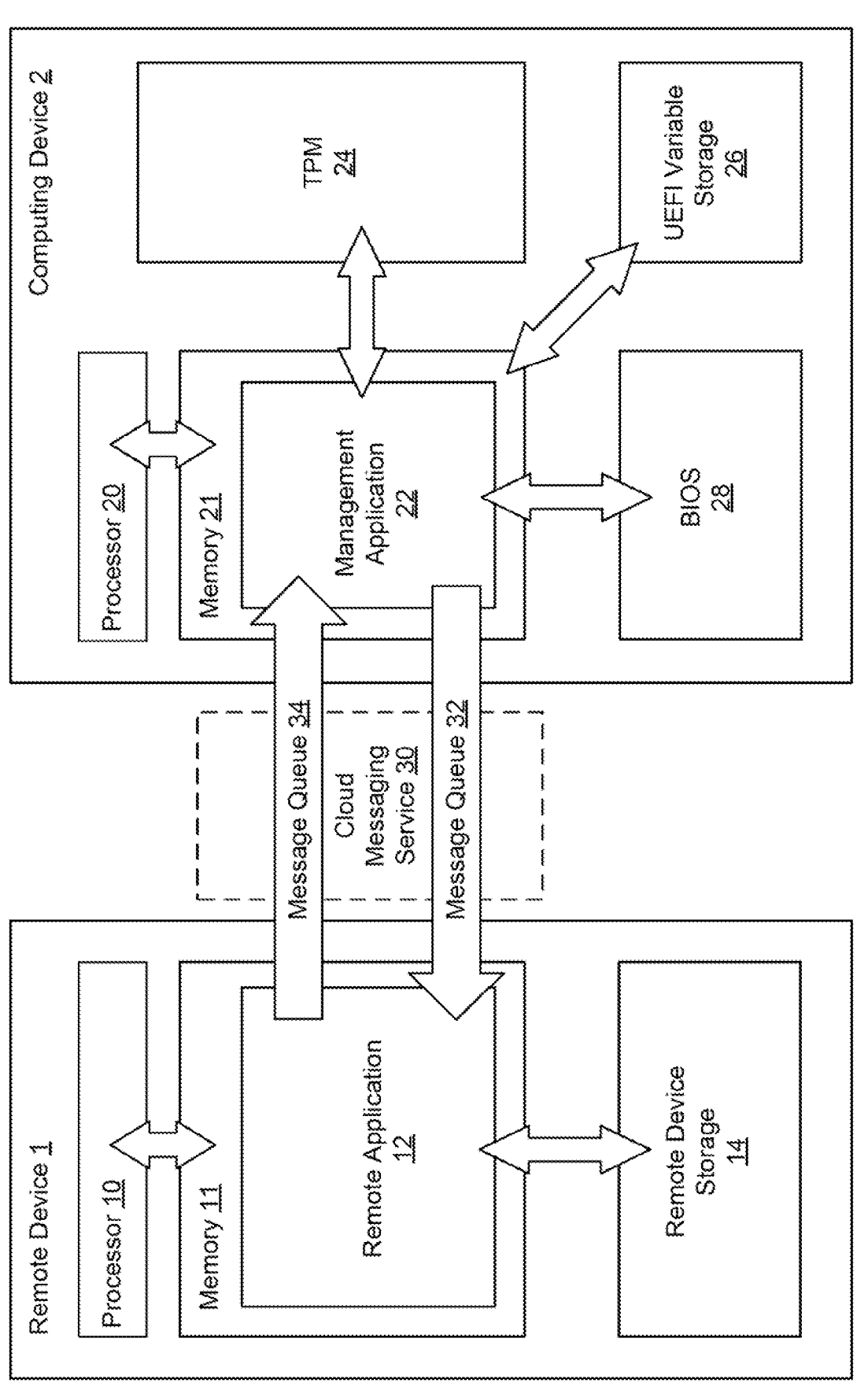
FIG. 1 is a block diagram of an example remote device and computing device, arranged to communicate via a cloud messaging service.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Further, reference in the specification to "a" "an" or similar language in relation to a particular feature, structure or characteristic described means a single feature/structure/ characteristic or at least one feature/structure/characteristic. Thus, this wording should not be construed as limiting in its use.

Settings for a basic input/output system (BIOS) of a computer system may be configured by a user in order to control low-level operation of a computing device. Local access to BIOS settings may be provided during a boot process of a computer, for example through use of a hotkey, which may provide a basic user interface to allow configuration of the BIOS settings. This user interface may be constrained by limitations of code size for storing the BIOS. Accessing BIOS in this manner may be carried out by rebooting of the computing device. The time duration for a user to press the appropriate hotkey to access the BIOS may be very short, and if missed require a further reboot.

In some examples BIOS settings may be managed using a dedicated management system or server by a system or network administrator. Such an arrangement may be particularly appropriate for enterprise environments. A dedicated BIOS management system may use an enterprise computer network infrastructure to access and manage computing devices on the network, providing a management interface accessible to a user with administrator permissions. The infrastructure to use a dedicated BIOS management system may be costly or require specialised expertise to set-up and run, thus making such infrastructure inaccessible to a single user, or for small-scale business applications. Further, increasing the capacity of a dedicated BIOS management system may require replacing or supplementing existing network hardware, often at significant cost.

In examples, a more flexible and simpler arrangement for managing BIOS settings may be provided by using a remote device to securely manage BIOS settings on a computing device, whereby a user may use the remote device to view and modify BIOS settings of the computing device remotely. The BIOS settings may be viewed and modified without use of a dedicated management system or servers, such as those used in enterprise environments. Instead, an open cloud-based infrastructure may be used to facilitate communication between the remote device and the computing device, eliminating the necessity for dedicated management infrastructure, thus reducing the complexity of setup and use of the remote device for managing the BIOS of the computing device, in particular in single-user or small-scale computer networks. Thus, BIOS settings of a computing device may be individually managed by a user using the remote device, as opposed to being managed remotely by a system or network administrator.

Viewing and managing BIOS settings of a computing device using a remote device, for example a smartphone, may provide an improved user experience compared to alternative methods of accessing and managing BIOS settings. For example, the remote device may be used to manage BIOS settings without rebooting the computing device to access an onboard BIOS setting interface. Additionally, a user interface for the onboard BIOS setting interface of the computing device may be basic and unintuitive, due to constraints of limited code size.

Without a dependence on dedicated a management system, for example an enterprise management system operating on a server maintained by an administrator of the computing device, and by instead using a cloud-based infrastructure to facilitate communication, it is possible to scale the methods disclosed herein for large-scale computer networks without upgrades to a physical server hardware on the network. Rather, an administrator can merely expand the available capacity for hosting messaging queues on the cloud-based infrastructure.

Modification of a BIOS of the computing device may include changing a setting of the BIOS, adding a function to the BIOS, removing a function from the BIOS, modifying a function of the BIOS, updating the BIOS, replacing the BIOS, or similar.

Example BIOS functions and settings may include selection of a boot device (for example a hard drive, external memory device, network, or similar), a boot device order, a CPU operating frequency, an operating voltage, peripheral device settings, display settings, power management settings, fan/cooling settings, wake-on-LAN settings, and similar.

An Enhanced BIOS Authentication Mode (EBAM) setting may be enabled in a BIOS of the computing device. The EBAM setting, when enabled, may prevent unauthorised changes to BIOS settings. When the EBAM setting is enabled, the BIOS may authenticate a signature provided with a BIOS setting change using a public key of a Signing Key (SK) asymmetric key pair before applying the change and reject a BIOS setting for which a corresponding signature cannot be authenticated. In examples, when the EBAM setting is enabled, the BIOS may apply signed or unsigned BIOS setting changes for BIOS settings classified as 'low security', but may reject unsigned BIOS setting changes for BIOS settings classified as 'high security'.

A Key Exchange Key (KEK) pair and a Signing Key (SK) pair may be used to ensure the authenticity of a change to a BIOS setting value. The KEK may be a secure boot KEK, or similar, used to update whitelist or blacklist of public key values used to authenticate bootable software. In one approach, the KEK and SK may be generated and stored on the computing device, and signing of a BIOS setting may occur on the computing device. In another approach, the KEK and SK may be generated and stored on the remote device, and signing of a BIOS setting may occur on the remote device. The KEK may be used to allow the BIOS to authenticate an SK public key blob as an authorized SK public key to be used to authenticate updates or changes to BIOS settings.

FIG. 1 shows a block diagram of an example remote device 1 and computing device 2, arranged to communicate via a cloud messaging service 30. According to the example of FIG. 1, the remote device 1 comprises a processor 10 and a memory 11 coupled to the processor 10, arranged to execute a remote application 12. The remote device 1 further comprises a remote device storage 14, accessible by the remote application 12.

The example computing device 2 of FIG. 1 comprises a processor 20 and a memory 21 coupled to the processor 20, arranged to execute a management application 22. The computing device 2 further comprises a trusted platform module (TPM) 24. The computing device may comprise UEFI variable storage 26, and a BIOS 28 to initialize the computing device 2.

The cloud messaging service 30 of FIG. 1 comprises a message queueing service deployed in a compute cloud, supporting sending of messages between devices. The cloud messaging service 30 comprises a first message queue 32 and a second message queue 34, each of the first message queue 32 and the second message queue 34 providing a single direction of communication. The remote application 12 of the remote device 1 may subscribe to the first message queue 32 to receive messages from the computing device 2. The management application 22 of the computing device 2 may subscribe to the second message queue 34 to receive messages from the remote device 1. The first message queue 32 and the second message queue 34 may each be accessible via an uniform resource locator (URL). In examples, the first message queue 32 and the second message queue 34 may use hypertext transfer protocol (HTTP). In examples, the first message queue 32 and the second message queue 34 may use hypertext transfer protocol secure (HTTPS).

Figure 2:
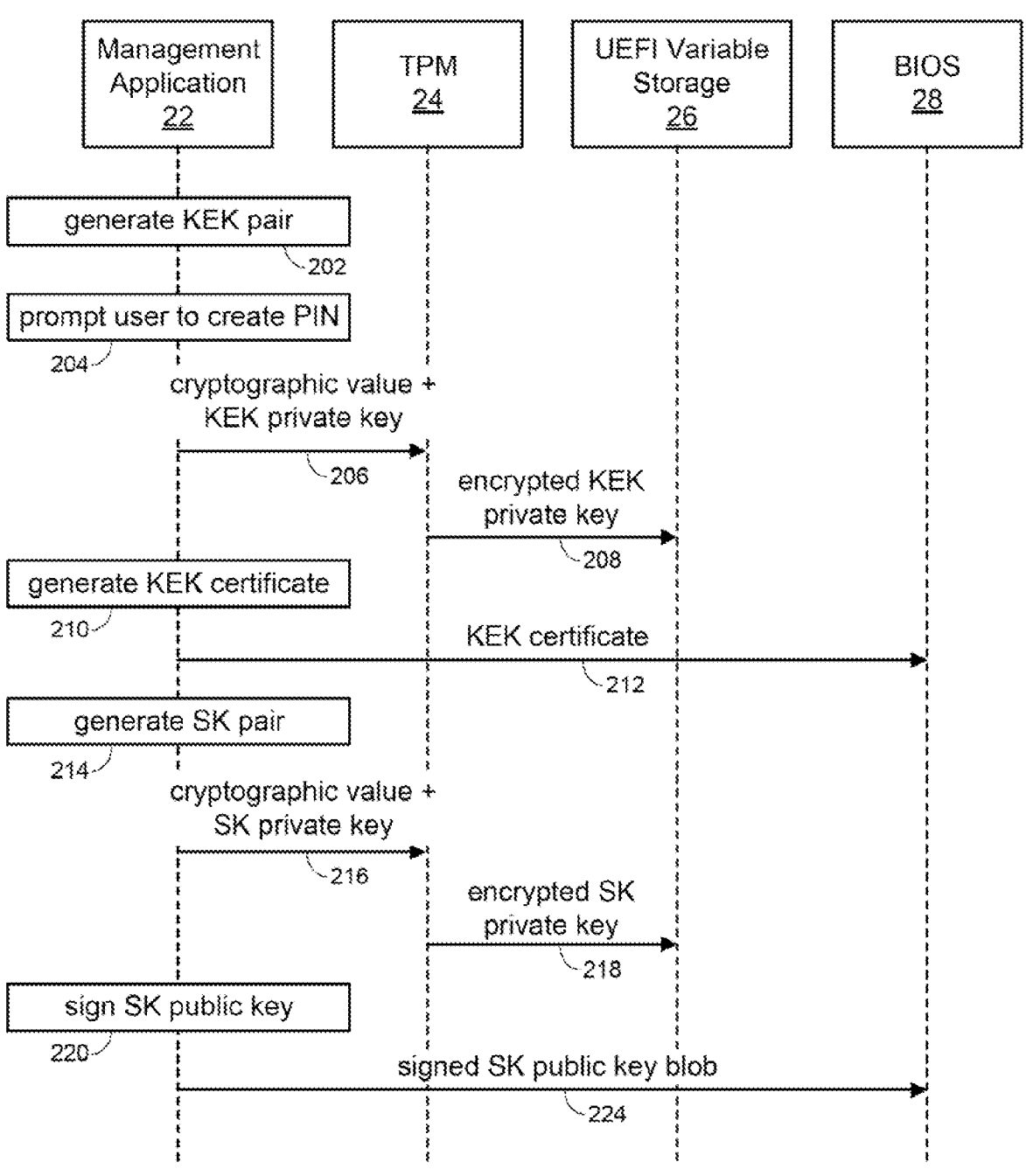
FIG. 2 is a sequence diagram illustrating an example method of generating and storing a public-private key pair at a computing device.

FIG. 2 shows a sequence diagram illustrating an example method of generating and storing a public-private key pair at a computing device 2. According to the example of FIG. 2, a Key Exchange Key (KEK) asymmetric key pair (also referred to as a public-private key pair) is generated 202 by a management application 22 of the computing device 2. The KEK asymmetric key pair comprises a KEK private key and a KEK public key. The management application 22 prompts 204 the user to generate a personal identification number (PIN), which is used by the management application 22 to generate a cryptographic value such as a PIN hash. The cryptographic value and the KEK private key are then sent 206 to a TPM 24 to generate an encrypted KEK private key, which is stored 208 securely, for example using UEFI variable storage 26. The management application 22 generates 210 a KEK certificate, which is provisioned 212 to the BIOS 28 of the computing device 2.

A Sign Key (SK) asymmetric key pair is generated 214 by the management application 22. The SK asymmetric key pair comprises a SK private key and a SK public key. The cryptographic value and the SK private key are sent 216 to the TPM 24 to generate an encrypted SK private key, which is stored 218 securely, for example using UEFI variable storage 26. The management application 22 signs 220 the SK public key using the KEK private key, to generate a signed SK public key blob. The signed SK public key blob is provisioned 224 to the BIOS 28 of the computing device 2. Accordingly, the SK public key is stored by the BIOS 28, and may be used to validate a signature of a BIOS setting that has been signed by the SK private key, to allow authentication of an updated BIOS setting provided to the BIOS.

Figure 3:
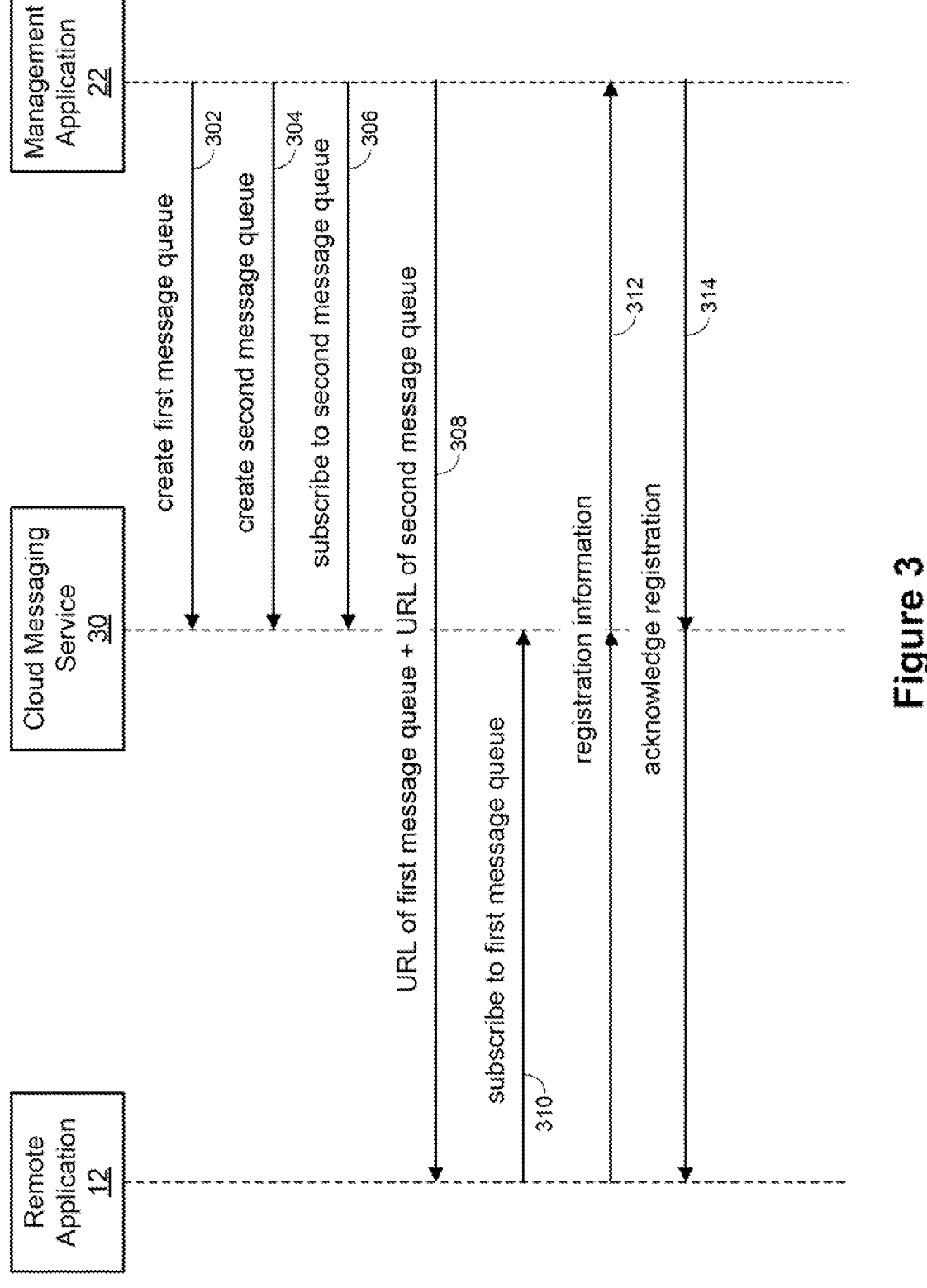
FIG. 3 is a sequence diagram illustrating an example method of pairing a remote device with a computing device.

FIG. 3 shows a sequence diagram illustrating an example method of pairing a remote device, for example remote device 1 of FIG. 1, with a computing device, for example computing device 2 of FIG. 1, via a cloud messaging service 30 to establish a communication channel between the remote device and the computing device which can be used for further communication.

According to the example of FIG. 3, creation 302 of a first message queue 32 is initiated by a management application 22 of the computing device. The first message queue 32 comprises an up-queue on the cloud messaging service 30 for sending a message from the computing device to the remote device. Creation 304 of a second message queue 34 is initiated by the management application 22, the second message queue 34 comprising a down-queue on the cloud messaging service 30 for sending a message from the remote device to the computing device. The management application 22 subscribes 306 to the second message queue 34 in order to receive messages from the remote device.

The management application 22 provides an indication 308 to the remote device by a means of contactless communication. The indication may comprise a first URL of the first message queue 32 and a second URL of the second message queue 34. In examples, the contactless communication may be a machine-readable graphical rendering, such as a barcode or a two-dimensional barcode (for example, a quick response (QR) code, matrix code, colour barcode, or similar), that may be captured by a camera of the remote device, or a near field communication (NFC) tag which may be read by a sensor of the remote device. In examples, the indication may further comprise a name or identifier of the computing device, cryptographic artefacts for establishing and securing the communication channel, or a combination thereof.

The remote application 12 subscribes 310 to the first message queue 32 in order to receive messages from the computing device. The remote application 12 registers with the management application 22 by sending 312 registration information to the management application 22 using the second message queue 34. The registration information may include a name or identifier of the remote device. The management application 22 receives the registration information from the second message queue 34, and sends 314 an acknowledgement to the remote application 12 using the first message queue 32.

Following completion of the registration process, all or part of the methods described in FIG. 4, 5, 7 or 8 may be carried out. For example, the management application 22 may send information regarding a current BIOS setting to the remote application 12 using the first message queue 32.

During the registration process, the remote application 12 and the management application 22 may perform additional cryptographic handshakes such as by exchanging public keys, by using a Diffie-Hellman key exchange, or similar. The remote application 12 and the management application 22 may then subsequently encrypt, sign, or encrypt and sign all subsequent communication.

Figure 4:
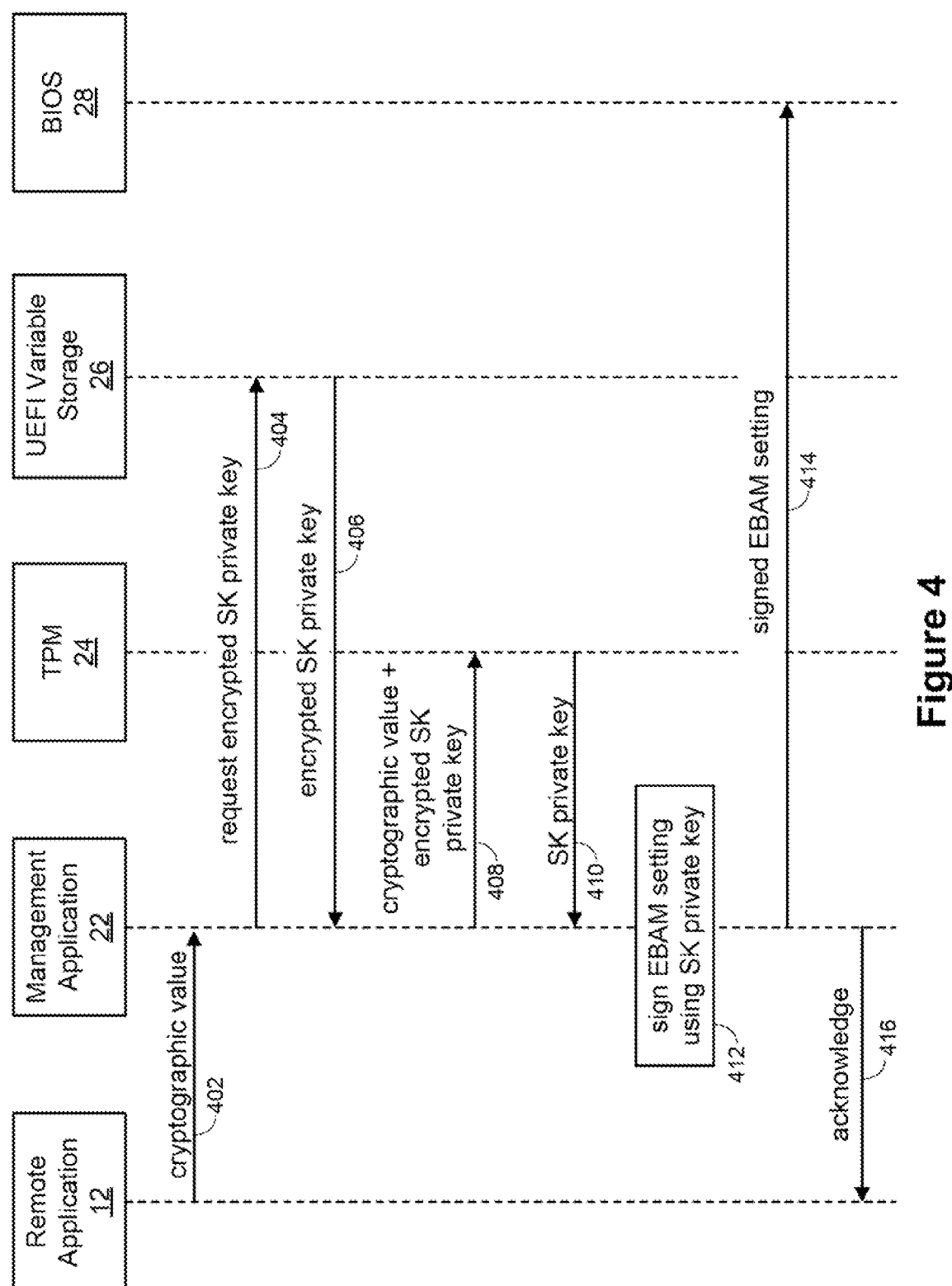
FIG. 4 is a sequence diagram illustrating an example method of preparing a computing device to be remotely managed.

FIG. 4 shows a sequence diagram illustrating an example method of a provisioning process for preparing a computing device, for example computing device 2 of FIG. 1, to be remotely managed by a remote device, such as remote device 1 of FIG. 1, following completion of an association process such as that described in FIG. 3. According to the example of FIG. 4, a remote application 12 sends 402 a cryptographic value to a management application 22 using a second message queue 34. The cryptographic value may comprise a PIN hash generated using a PIN generated in a setup stage, such as the example shown in FIG. 2. An encrypted SK private key is requested 404 and recovered 406 from UEFI variable storage 26 by the management application 22. The management application 22 sends 408 the encrypted SK private key and the cryptographic value to a TPM 24, which decrypts and returns 410 the SK private key to the management application 22.

The management application 22 uses the decrypted SK private key to sign 412 a BIOS setting to enable an Enhanced BIOS Authentication Mode (EBAM). The EBAM mechanism, when enabled, may prevent unauthorised changes to BIOS settings. In examples, the EBAM mechanism prevents use of a Windows Management Instrumentation (WMI) interface to make unauthorised changes to BIOS settings. The signed BIOS setting to enable EBAM is sent 414 to the BIOS 28. The management application 22 sends 416 an acknowledgement to the remote application 12 using a first message queue 32 to indicate that the EBAM mechanism has been successfully enabled in the BIOS 28.

Figure 5:
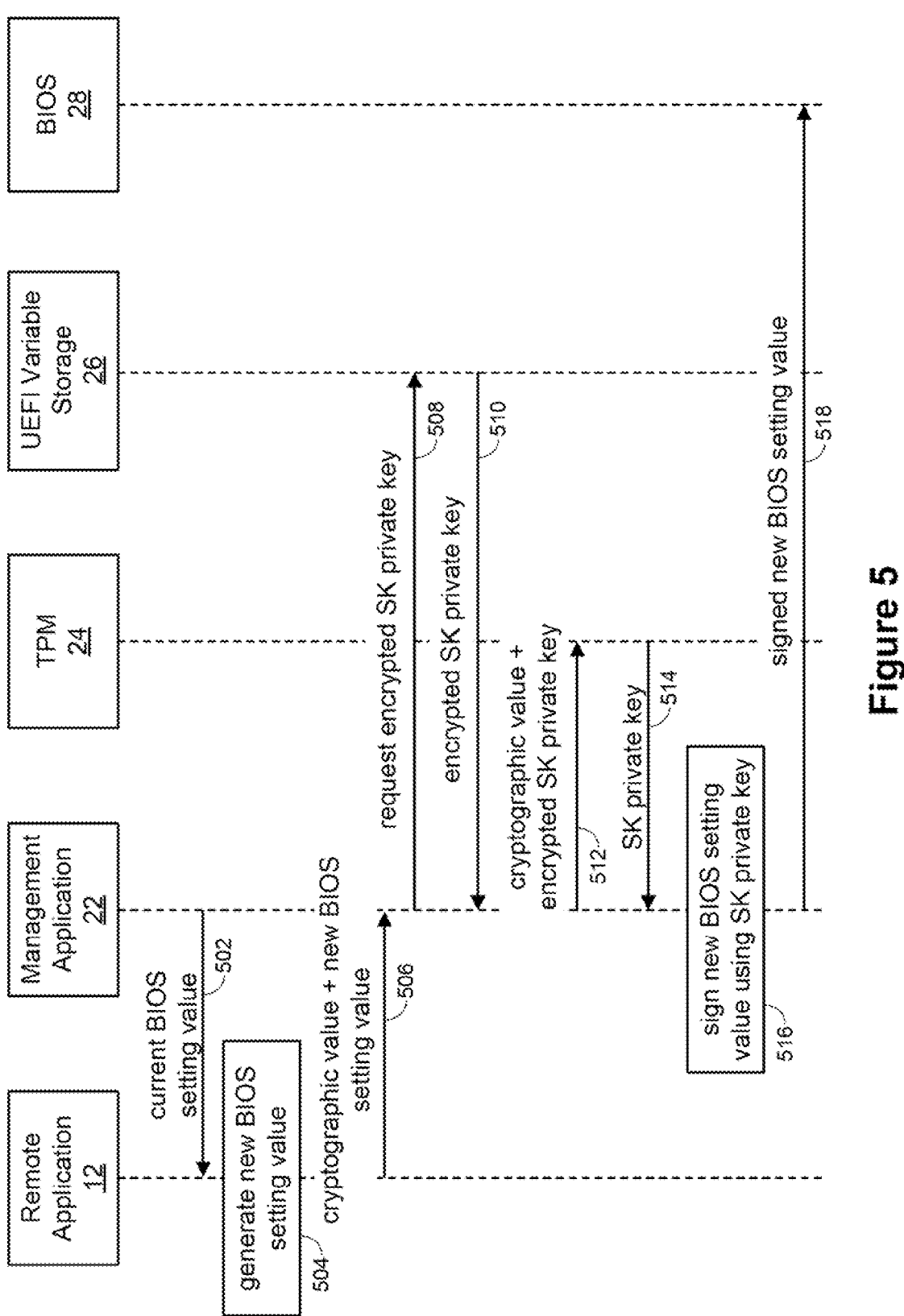
FIG. 5 is a sequence diagram illustrating an example method of managing settings of a computing device using a remote device.

FIG. 5 shows a sequence diagram illustrating an example method of managing settings of a computing device, for example computing device 2 of FIG. 1, using a remote device, for example remote device 1 of FIG. 1. According to the example of FIG. 5, the management application 22 sends 502 a current BIOS setting value to the remote application 12 using the first message queue 32. The current BIOS setting value may be displayed to a user of the remote device using a display of the remote device. The display may be a display panel on the remote device, or may be a display device separate from and communicatively coupled to the remote device. The remote application then generates 504 a new BIOS setting value. The new BIOS setting value may be generated in response to a user input, an automatic change to the BIOS setting value determined by the remote application 12, or a combination thereof.

The new BIOS setting value is sent 506 along with a cryptographic value to the management application 22 via a second message queue 34. The cryptographic value may comprise be a PIN hash generated using a PIN generated in a setup stage, such as the example shown in FIG. 2. Sending the cryptographic value may be subject to authentication of a user of the remote device. An encrypted SK private key is requested 508 and recovered 510 from UEFI variable storage 26 by the management application 22. The management application 22 sends 512 the encrypted SK private key and the cryptographic value to a TPM 24, which decrypts and returns 514 the SK private key to the management application 22.

The management application 22 uses the decrypted SK private key to sign 516 the new BIOS setting value. In examples, the management application 22 may send the new BIOS setting value to the TPM 24 to sign using the decrypted SK private key. The signed new BIOS setting value is sent 518 to the BIOS 28. The BIOS 28 uses the SK public key blob to validate the signature of the signed new BIOS setting before applying the new BIOS setting.

Figure 6:
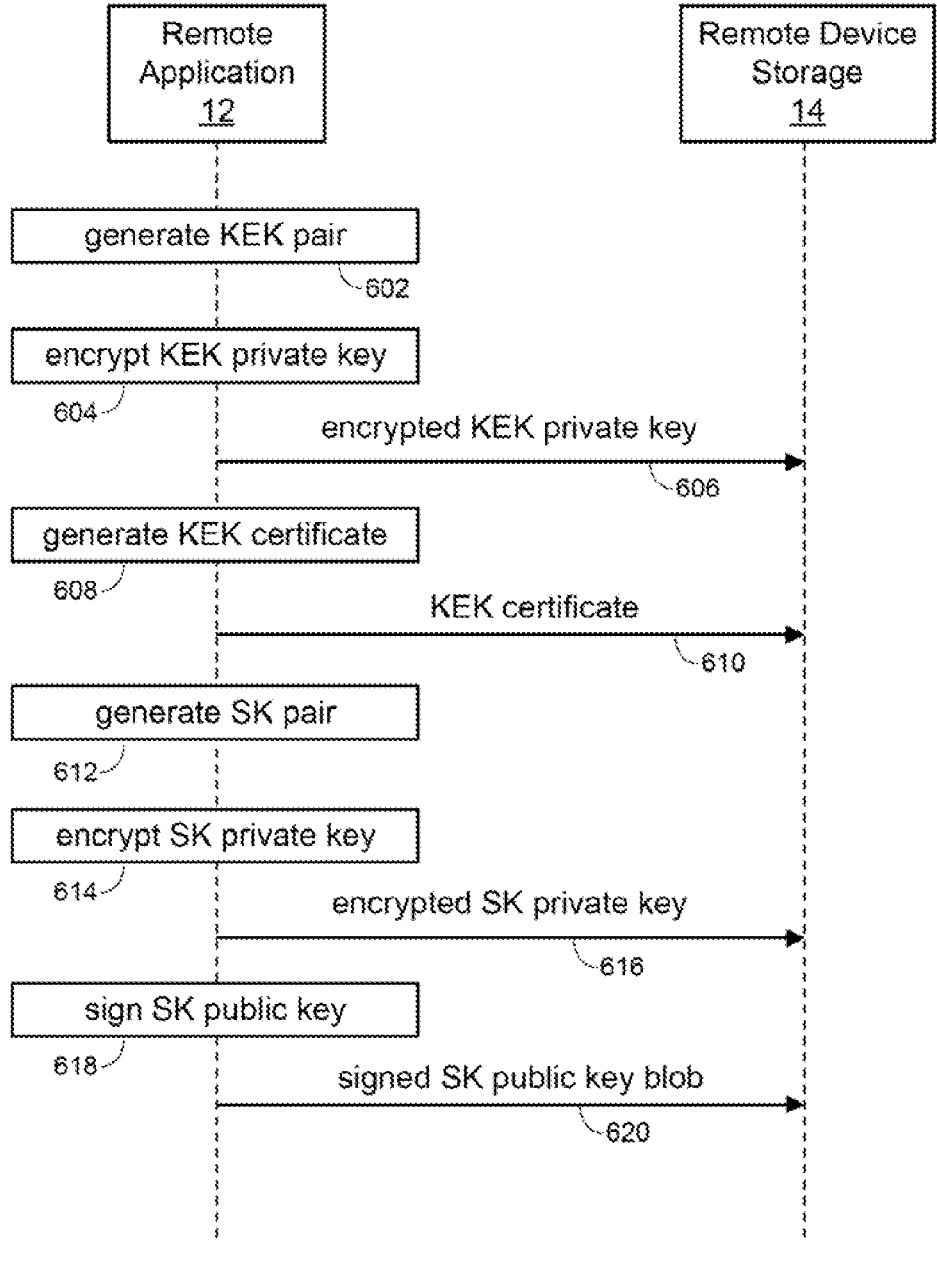
FIG. 6 is a sequence diagram illustrating an example method of generating and storing a public-private key pair at a remote device.

FIG. 6 shows a sequence diagram illustrating an example method of generating and storing a public-private key pair at a remote device, for example remote device 1 of FIG. 1. According to the example of FIG. 6, a KEK asymmetric key pair is generated 602 by a remote application 12 of the remote device. The KEK asymmetric key pair comprises a KEK private key and a KEK public key. The KEK private key is encrypted 604 using an encryption method which allows decryption based on a user's presence, for example a biometric encryption method. In examples, other methods of proving or verifying a user identity may be used to encrypt the KEK private key, including use of a PIN, alphanumeric passphrase, two-factor authentication security key or token, or similar. The encrypted KEK private key is stored 606 in a remote device storage 14 of the remote device. The remote application 22 generates 608 a KEK certificate, which is stored 610 in the remote device storage 14 of the remote device.

A SK asymmetric key pair is generated 612 by the remote application 12. The SK asymmetric key pair comprises a SK private key and a SK public key. The SK private key is encrypted 614 using an encryption method which allows decryption based on a user's presence. In examples, the encryption method may be the same encryption method as used to encrypt the KEK private key. The encrypted SK private key is stored 616 in a remote device storage 14 of the remote device. The remote application 12 signs 618 the SK public key using the KEK private key, to generate a signed SK public key blob. The signed SK public key blob is be stored 620 in the remote device storage 14 of the remote device.

In examples, the encrypted KEK private key, the KEK certificate, the encrypted SK private key, the signed SK public key blob, or a combination thereof, may be stored in a backup cloud storage separate from the remote device.

An example method of pairing the remote device, such as remote device 1 of FIG. 1, with the computing device, such as computing device 2 of FIG. 1, via a cloud messaging service, such as cloud messaging service 30 of FIG. 1, to establish a communication channel between the remote device and the computing device is shown in FIG. 3, and is described in relation to said figure. This method of pairing the remote device 1 with the computing device 2 may be substantially the same both when a SK asymmetric key pair is generated by the management application 22 and when a SK asymmetric key pair is generated by the remote application 12.

Figure 7:
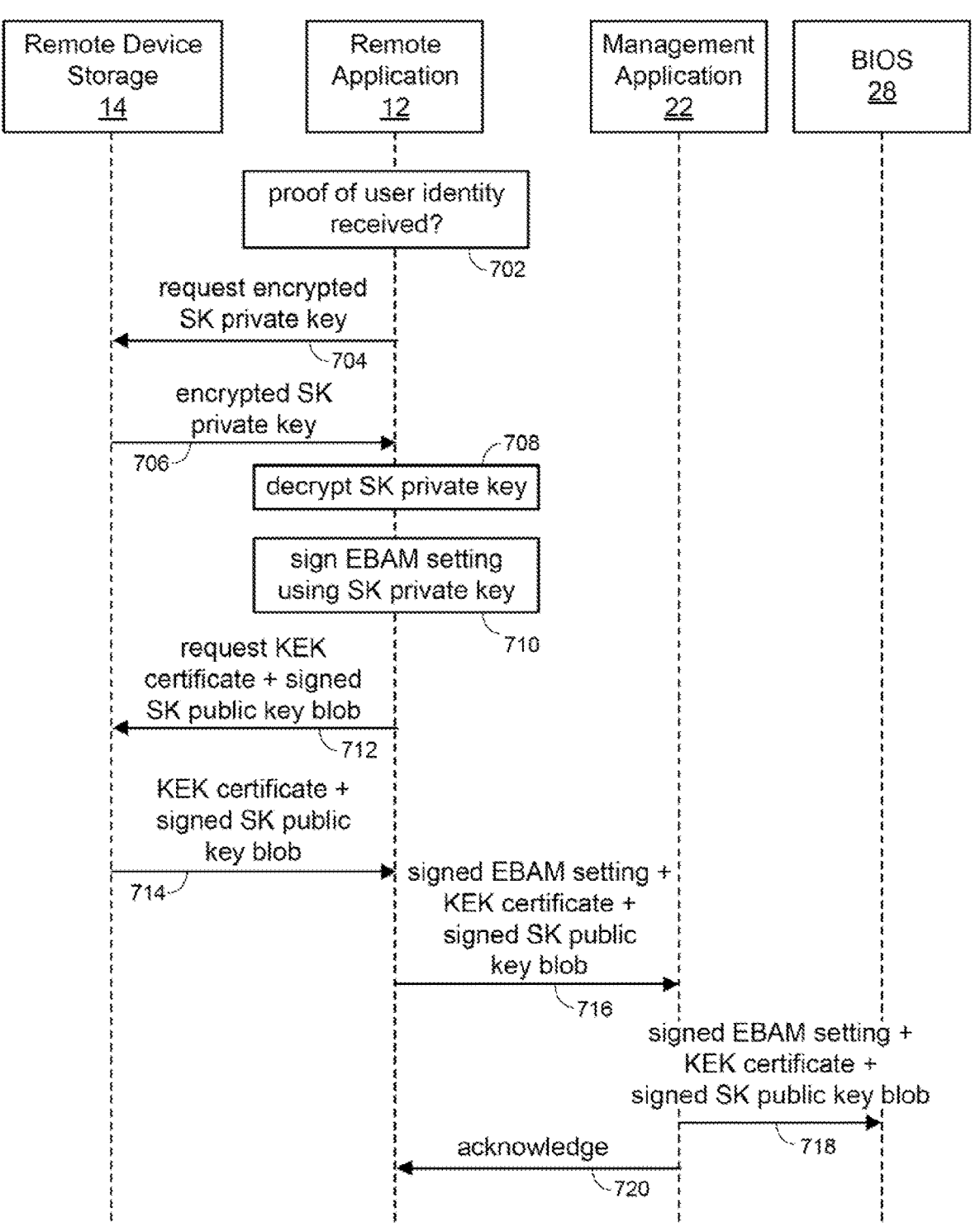
FIG. 7 is a sequence diagram illustrating an example method of preparing a computing device to be remotely managed.

FIG. 7 shows a sequence diagram illustrating an example method of a provisioning process for preparing a computing device 2 to be remotely managed by a remote device 1. According to the example of FIG. 7, in response to the remote application 12 receiving 702 proof or verification of a user's identity or presence, an encrypted SK private key is requested 704 and recovered 706 from a remote device storage 14 of the remote device 1 by the remote application 12. The remote application 12 decrypts 708 the SK private key based on the verified presence of the user. The remote application 12 uses the decrypted SK private key to sign 710 a BIOS setting to enable an Enhanced BIOS Authentication Mode (EBAM).

The remote application 12 requests 712 and recovers 714 a KEK certificate and a signed SK public key blob from the remote device storage 14 of the remote device 1. The signed BIOS setting to enable EBAM, the KEK certificate, and the signed SK public key blob are sent 716 to a management application 22 of the computing device 2 using a second message queue 34. The management application 22 provisions 718 a BIOS 28 of the computing device 2 with the KEK certificate and signed SK public key blob, and applies the signed BIOS setting to enable EBAM to the BIOS 28. The management application 22 sends 720 an acknowledgement to the remote application 12 using a first message queue 32 to indicate that the EBAM setting has been successfully enabled in the BIOS 28.

Figure 8:
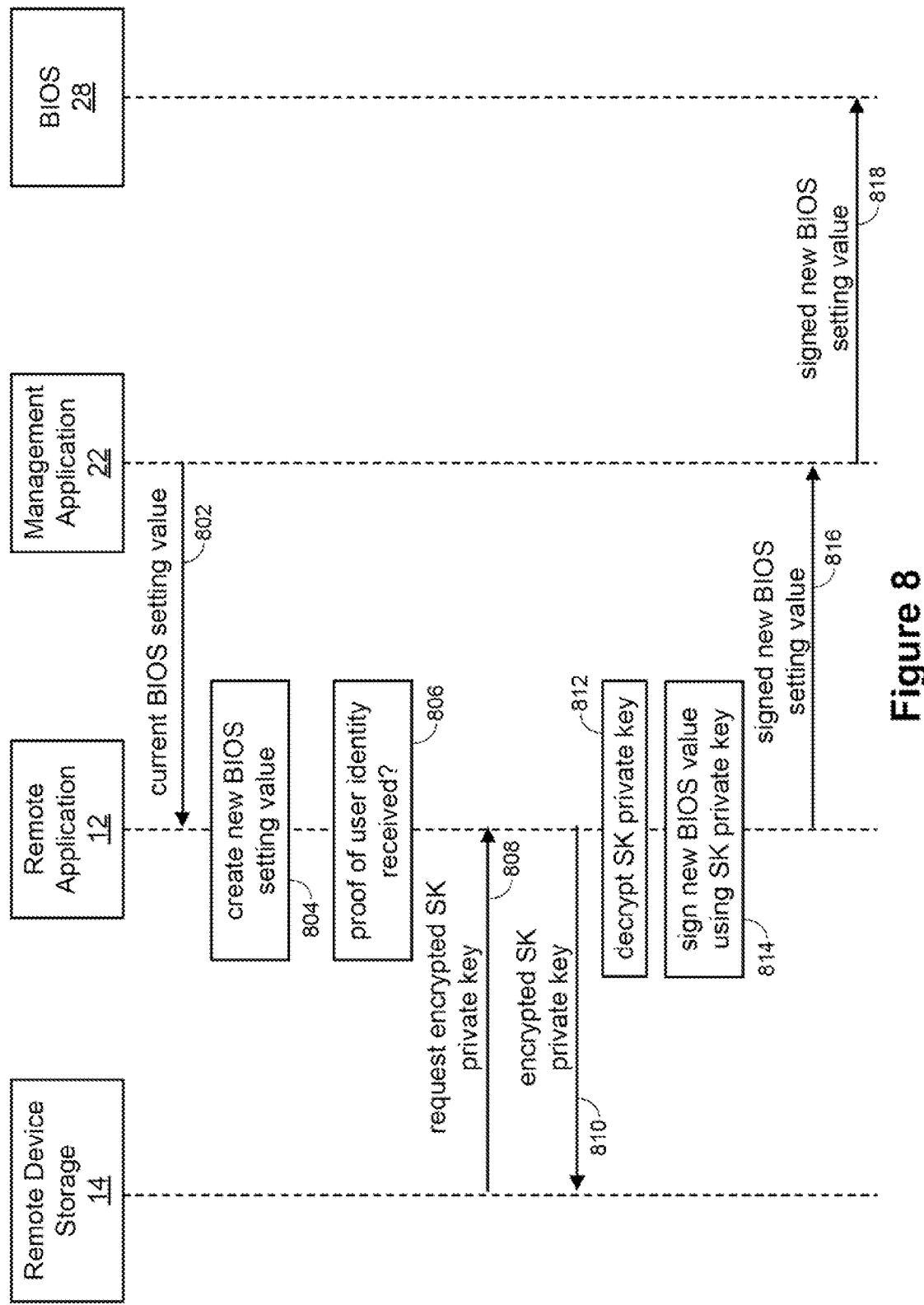
FIG. 8 is a sequence diagram illustrating an example method of managing settings of a computing device using a remote device.

FIG. 8 shows a sequence diagram illustrating an example method of managing settings of a computing device 2 using a remote device 1. According to the example of FIG. 8, the management application 22 sends 802 a current BIOS setting value to the remote application 12 using a first message queue 32. The current BIOS setting value may be displayed to a user of the remote device 1 using a display of the remote device. The display may be a display panel on the remote device 1, or may be a display device separate from and communicatively coupled to the remote device 1. The remote application generates 804 a new BIOS setting value. The new BIOS setting value may be generated in response to a user input, an automatic change to the BIOS setting value determined by the remote application 12, or a combination thereof.

In response to the remote application 12 receiving 806 proof or verification of a user's identity or presence, an encrypted SK private key, corresponding to a public key blob stored by the BIOS 28, is requested 808 and recovered 810 from a remote device storage 14 of the remote device 1 by the remote application 12. The remote application 12 decrypts 812 the SK private key based on the verified presence of the user. The remote application 12 signs 814 the new BIOS setting value using the decrypted SK private key.

The signed new BIOS setting value is sent 816 to the management application 22 via a second message queue 34. The signed new BIOS setting value is sent 818 to the BIOS 28 by the management application 22. The BIOS 28 uses a SK public key blob, for example as provided according to the method of FIG. 2, to validate the signature of the signed new BIOS setting before applying the new BIOS setting.

According to some examples described herein, a single remote device 1 may be used to manage a single computing device 2. In some examples, a single remote device 1 may be used to manage a plurality of computing devices 2. In some examples, a plurality of remote devices 1 may be used to manage a single computing device 2. In some examples, a plurality of remote devices 1 may be used to manage a plurality of computing devices 2.

Figure 9:
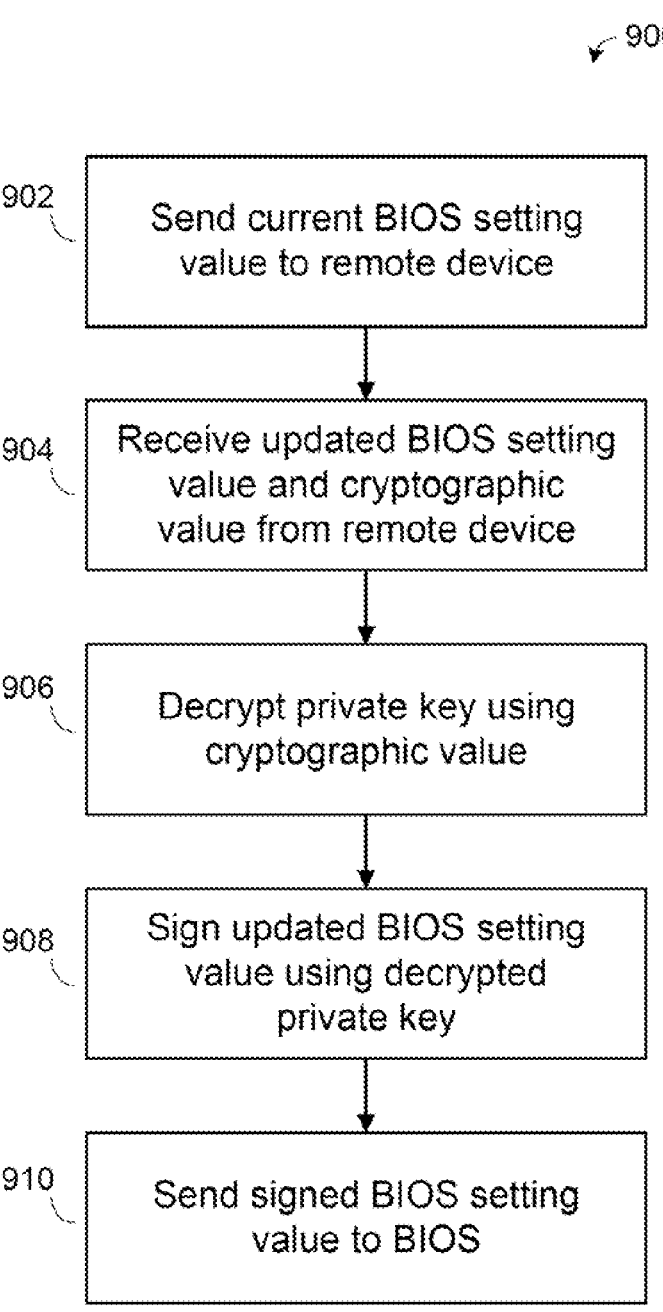
FIG. 9 is a flowchart illustrating an example method of managing settings of a computing device using a remote device.

FIG. 9 shows a flowchart of an example method 900 of managing settings of a computing device, for example computing device 2 of FIG. 1, using a remote device, for example remote device 1 of FIG. 1. The example method of FIG. 9 may be carried out by a management application 22 of the computing device 2. At block 902, the computing device 2 sends a current BIOS setting value to a remote device 1. At block 904, the computing device 2 receives an updated, new, or otherwise changed BIOS setting value from the remote device 1, along with a cryptographic value. The cryptographic value may comprise a PIN hash generated using a PIN generated in a setup stage, such as the example shown in FIG. 2. At block 906, the computing device 2 uses the cryptographic value to decrypt a private key of a public-private key pair. The encrypted private key may be stored in a UEFI variable of the computing device 2. The decryption may be carried out by a TPM 24 of the computing device 2. At block 908, the computing device 2 signs the updated BIOS setting value using the decrypted private key. At block 910, the computing device 2 sends or applies the signed BIOS setting value to a BIOS 28 of the computing device 2, wherein the BIOS 28 may use a SK public key blob, for example as provided according to the method of FIG. 2, to authenticate the signature of the signed new BIOS setting before applying the new BIOS setting.

In examples, the method 900 of FIG. 9 may additionally comprise any of the steps described in relation to FIG. 5.

Figure 10:
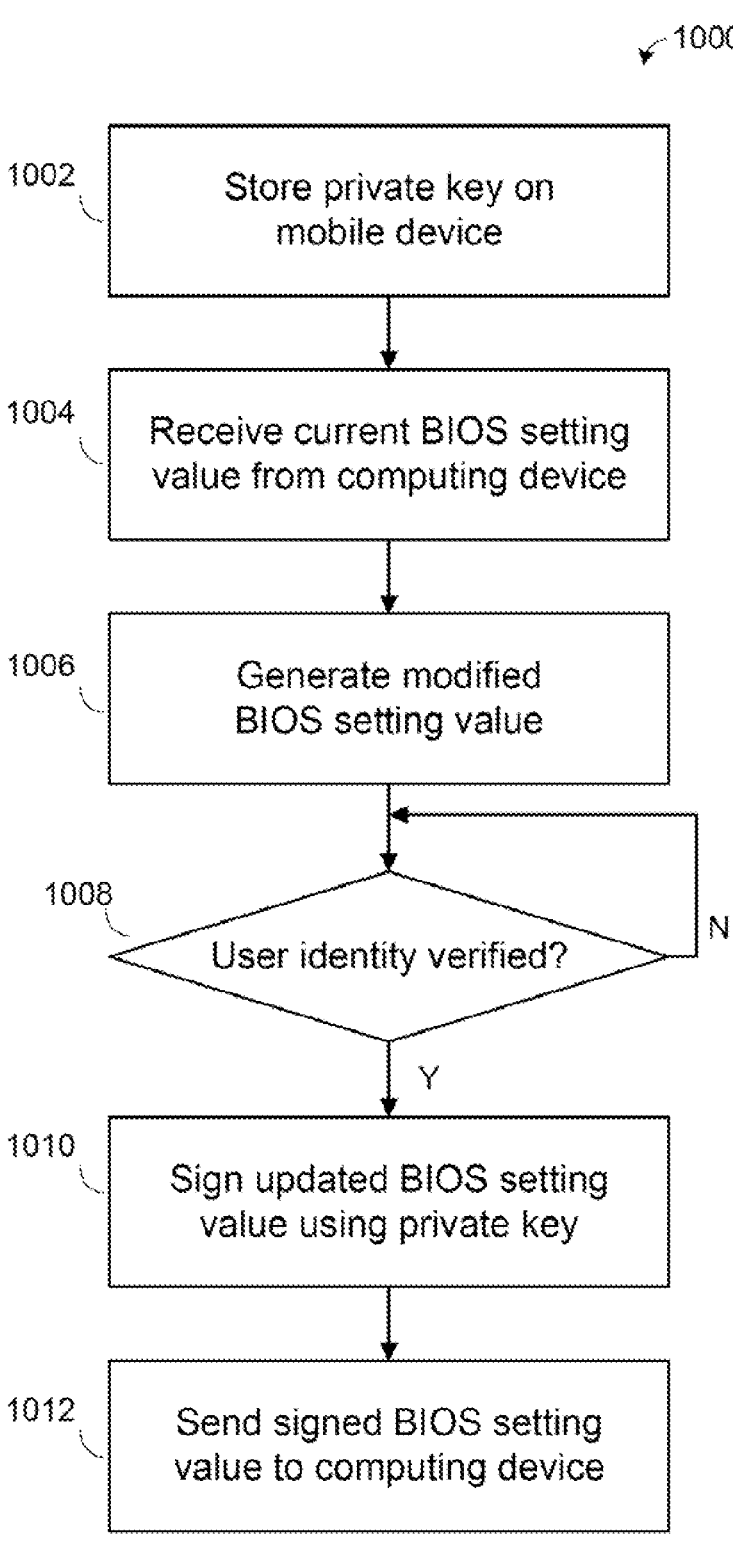
FIG. 10 is a flowchart illustrating an example method of managing settings of a computing device using a remote device.

FIG. 10 shows a flowchart of an example method 1000 of managing settings of a computing device, for example the computing device 2 of FIG. 1, using a remote device, for example the remote device 1 of FIG. 1. The example method of FIG. 10 may be carried out by a remote application 12 of the remote device 1. The remote device 1 may also be referred to as a mobile device. At block 1002, a private key of a public-private key pair is stored in a memory of the remote device 1, for example remote device storage 14 of remote device 1. At block 1004, the remote device 1 receives a current BIOS setting value from a computing device 2. At block 1006, the remote device 1 generates a modified BIOS setting value. The modified BIOS setting value may be an updated, new, or otherwise changed version of the current BIOS setting value received from the computing device 2. At block 1008, the remote device 1 determines whether an identity of a user of the remote device 1 has been verified, or otherwise authenticated. If the identity of the user has been successfully verified, the remote device 1 proceeds to block 1010. At block 1010, the remote device 1 signs the updated BIOS setting value using the private key stored on the remote device 1. At block 1012, the remote device 1 sends the signed BIOS setting value to the computing device 2, in order for the computing device 2 to apply the signed BIOS setting value to the BIOS 28 of the computing device 2.

In examples, the method 1000 of FIG. 10 may additionally comprise any of the steps described in relation to FIG. 8.

Figure 11:
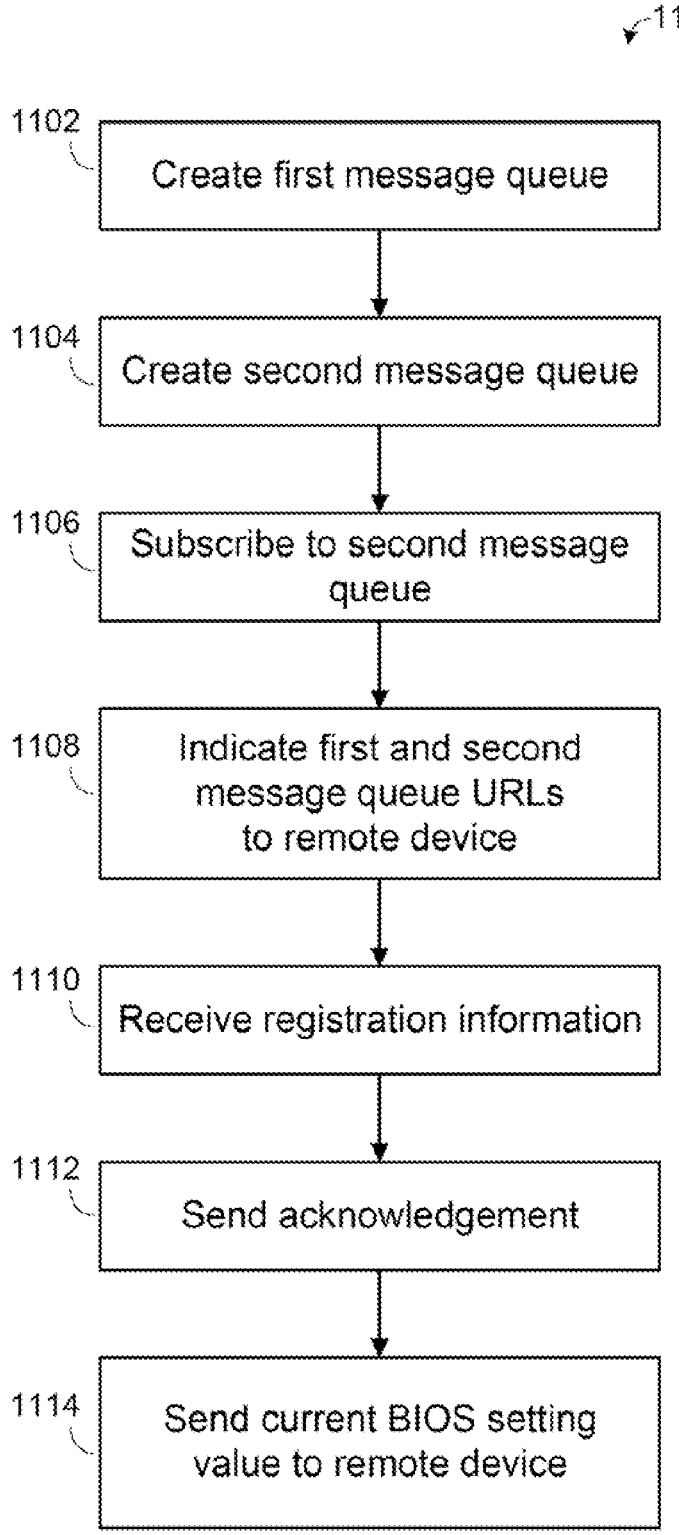
FIG. 11 is a flowchart illustrating an example method of pairing a remote device with a computing device.

FIG. 11 shows a flowchart of an example method 1100 of pairing a remote device, for example the remote device 1 of FIG. 1, with a computing device 2, for example the computing device 2 of FIG. 1. The example method of FIG. 11 may be carried out by a management application 22 of the computing device 2. At block 1102, the computing device 2 initiates creation of a first message queue 32 on a cloud message service 30. At block 1104, the computing device 2 initiates creation of a second message queue 34 on the cloud message service 30. At block 1106, the computing device 2 subscribes to the second message queue 34. At block 1108, the computing device 2 indicates a first URL of the first message queue 32 and a second URL of the second message queue 34 to a remote device 1. The indication of the first and second URLs may be provided via a contactless communication channel, such as described above, for example using a barcode or QR code. At block 1110, the computing device 2 receives registration information from the remote device 1 via the second message queue 34. At block 1112, the computing device 2 sends an acknowledgement to the remote device 1 via the first message queue 32. At block 1114, the computing device 2 sends a current BIOS setting value to the remote device 1 via the first message queue 32.

In examples, the method 1100 of FIG. 11 may additionally comprise any of the steps described in relation to FIG. 3.

Figure 12:
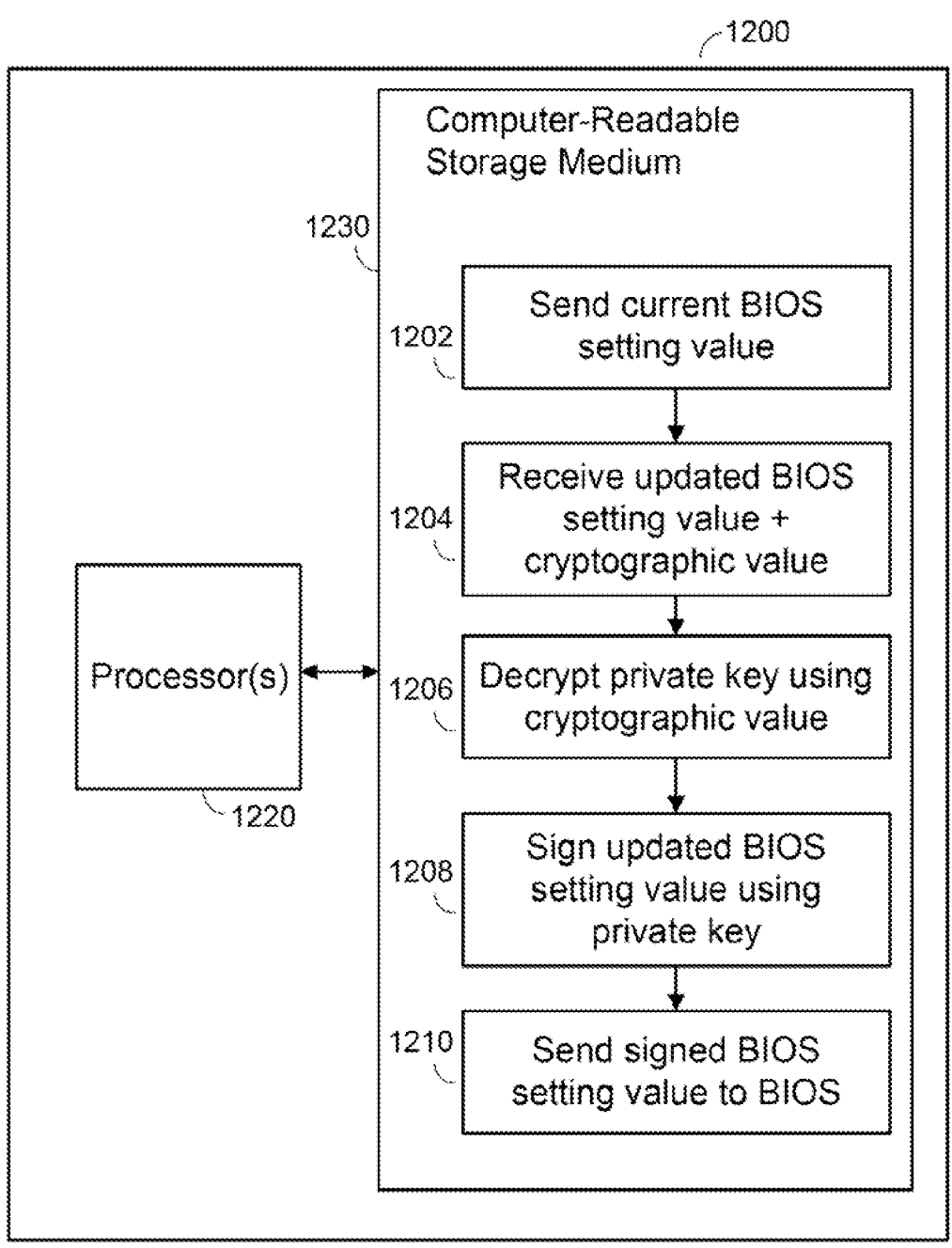
FIG. 12 is an example of a device comprising a computer-readable storage medium coupled to a processor.

Certain methods and systems as described herein may be implemented by a processor that processes program code that is retrieved from a non-transitory storage medium. As used herein, the term "non-transitory" does not encompass transitory propagating signals. In particular, all or part of the methods illustrated in FIGS. 2 to 11 may be implemented in the form of computer program code stored on computer readable media and executable by a processor to perform the described methods. FIG. 12 shows an example 1200 of a device comprising a computer-readable storage medium 1230 coupled to a processor 1220.

Processors suitable for the execution of computer program code include, by way of example, both general and special purpose microprocessors, application specific integrated circuits (ASIC) or field programmable gate arrays (FPGA) operable to retrieve and act on instructions and/or data from the computer-readable storage medium 1230.

The computer-readable storage medium 1230 may be any media that can contain, store, or maintain programs and data for use by or in connection with an instruction execution system (e.g., non-transitory computer readable media). Computer-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In FIG. 12, the computer-readable storage medium comprises program code to, when executed on a computing device: send 1202 a current BIOS setting value to a remote device 1, receive 1204 an updated BIOS setting value and a cryptographic value from the remote device 1, use 1206 the cryptographic value to decrypt a private key of a public-private key pair, sign 1208 the updated BIOS setting value using the decrypted private key, and send 1210 the signed BIOS setting value to a BIOS 28 of the computing device 2 to implement the method 900 illustrated in FIG. 9.

In other examples, the computer-readable storage medium 1230 may comprise program code to perform any of the methods, or parts thereof, illustrated in FIGS. 2 to 8, 10 and 11, and discussed above.

As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

As used herein, a computing device refers to a device having a BIOS. The computing device may be a desktop computer, server, notebook computer, tablet computer, smartphone, or similar device.

As used herein, a remote device refers to a device separate from the computing device which is suitable for managing a BIOS of the computing device. The remote device may be the same type of device as the computing device, or the remote device may be a different type of device to the computing device. In examples, the remote device may be a smartphone or tablet computer. The term 'mobile device' as used herein may be used interchangeably with the term 'remote device'.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants that fall within the scope of the claims.

According to an example, there is provided a non-transitory computer-readable storage medium comprising instructions that when executed cause a processor of a computing device to: send, to a remote device and via a first message queue on a cloud messaging service, a current Basic Input/Output System (BIOS) setting value; receive, from the remote device and via a second message queue on a cloud messaging service, an updated BIOS setting value and a cryptographic value; decrypt an encrypted private key of a public-private key pair stored in a memory of the computing device using the cryptographic value, wherein the public key of the public-private key pair is associated with a BIOS of the computing device; sign the updated BIOS setting value using the decrypted private key; provide the signed BIOS setting value to the BIOS of the computing device.

In an example, the encrypted private key may be stored as a unified extensible firmware interface (UEFI) variable.

In an example, the encrypted private key may comprise a signing key, and wherein the BIOS is configured to verify the signed BIOS setting value using the public key.

In an example, the public key of the public-private key pair may be stored by the BIOS.

In an example, the cryptographic value may be a personal identification number (PIN) hash.

In an example, the cryptographic value may be based on verifying a presence or identity of a user.

In an example, the updated BIOS setting value may be signed by a trusted platform module (TPM) of the computing device.

In an example, decrypting the encrypted private key may comprise sending the cryptographic value and the encrypted private key to a trusted platform module of the computing device.

According to an example, there is provided a non-transitory computer-readable storage medium comprising instructions that when executed cause a processor of a mobile device to: store a private key of a public-private key pair in a memory of the mobile device, wherein the public key of the public-private key pair is associated with a Basic Input/Output System (BIOS) of the computing device; receive, from the computing device, via a first message queue on a cloud messaging service, a current BIOS setting of the computing device; generating a modified BIOS setting value; in response to a proof of user identity: sign the modified BIOS setting value using the stored private key; and send to the computing device, via a second message queue on a cloud messaging service, the signed BIOS setting value.

In an example, the proof of user identity may comprise a biometric identification.

In an example, the proof of user identity may comprise use of a personal identification number (PIN).

In an example, the instructions may further cause the processor to, in response to the proof of user identity, send to the computer device: a key exchange key certificate, a signed public key blob corresponding to the private key, or a combination thereof.

According to an example, there is provided a non-transitory computer-readable storage medium comprising instructions that when executed cause a processor of a computing device to: create a first message queue, the first message queue comprising an up-queue on a cloud messaging service for sending a message to a remote device; create a second message queue, the second message queue comprising a down-queue on a cloud messaging service for receiving a message from the remote device; subscribe to the second messaging queue; provide an indication to the remote device via a contactless communication channel, the indication comprising a first uniform resource locator (URL) of the first messaging queue and a second URL of the second messaging queue; receive, from the remote device, registration information via the second messaging queue; send an acknowledgement of the registration information to the remote device via the first messaging queue; and send, to the remote device, a current Basic Input/Output System (BIOS) setting via the first messaging queue.

In an example, the instructions may further cause the processor to enable an enhanced BIOS authentication mode on BIOS of the computing device.

In an example, enabling the enhanced BIOS mode may comprise: receiving, from the remote device, a signed BIOS setting to enable an enhanced BIOS authentication mode on the BIOS of the computing device; and providing, to the BIOS of the computing device, the signed BIOS setting.

In an example, the signed BIOS setting may be signed using a signing key private key, and wherein the BIOS is configured to verify the signed BIOS setting value using a signing key public key associated with the BIOS of the computing device.

In an example, the instructions may further cause the processor to: receive, from the remote device and via the second messaging queue, an updated BIOS setting value and a cryptographic value; decrypt an encrypted private key of a public-private key pair stored in a memory of the computing device using the cryptographic value; sign the updated BIOS setting value using the decrypted private key; provide the signed BIOS setting value to a BIOS of the computing device.

In an example, the instructions may further cause the processor to: receive, from the remote device and via the second messaging queue, an updated BIOS setting value signed by a private key of a public-private key pair; and provide the updated BIOS setting signed by the private key to a BIOS of the computing device.

In an example, the registration information may comprise an encrypted private key of a public-private key pair.

In an example, the encrypted private key may be encrypted using a personal identification number (PIN) hash.

In an example, the registration information may comprise a name or identifier of the remote device, a public key of a public-private key pair, cryptographic artefacts for securing a communication channel, or a combination thereof.

In an example, the indication may comprise a quick response (OR) code.

The invention claimed is:

1. A non-transitory computer-readable storage medium comprising instructions that when executed cause a processor of a computing device to:

create a first message queue, the first message queue comprising an up-queue on a cloud messaging service for sending a message to a remote device;

create a second message queue, the second message queue comprising a down-queue on a cloud messaging service for receiving a message from the remote device;

subscribe to the second messaging queue;

generate, via a management application of the computing device, a public-private key pair;

provide an indication to the remote device via a contactless communication channel, the indication comprising a first uniform resource locator (URL) of the first messaging queue and a second URL of the second messaging queue;

receive, from the remote device, registration information via the second messaging queue;

send an acknowledgement of the registration information to the remote device via the first messaging queue;

send, to the remote device, a current Basic Input/Output System (BIOS) setting of the computing device via the first messaging queue;

receive, by the management application of the computing device, an updated BIOS setting value and a cryptographic value from the remote device and via the second messaging queue;

recover, by the management application of the computing device, a signing key (SK) private key of the public-private key pair from a united extensible firmware interface (UEFI) variable storage of the computing device;

send the SK private key and the cryptographic value from the management application to a trusted platform module (TPM) of the computing device;

decrypt, via the TPM of the computing device, the SK private key using the cryptographic value;

return the decrypted SK private key to the management application from the TPM;

sign, via the management application of the computing device, the updated BIOS setting value using the decrypted SK private key; and provide the signed updated BIOS setting value to a BIOS of the computing device.

2. The computer-readable storage medium of claim 1, wherein the instructions further cause the processor to enable an enhanced BIOS authentication mode on BIOS of the computing device.

3. The computer-readable storage medium of claim 2, wherein enabling the enhanced BIOS mode comprises:

receiving, from the remote device, a signed BIOS setting to enable an enhanced BIOS authentication mode on the BIOS of the computing device; and providing, to the BIOS of the computing device, the signed BIOS setting.

4. The computer-readable storage medium of claim 1, wherein the instructions further cause the processor to:

receive, from the remote device and via the second messaging queue, an updated BIOS setting value signed by a private key of a public-private key pair; and provide the updated BIOS setting signed by the private key to a BIOS of the computing device.

5. The computer-readable storage medium of claim 1, wherein the registration information comprises an encrypted private key of a public-private key pair.

6. The computer-readable storage medium of claim 1, wherein the registration information comprises a name or identifier of the remote device, a public key of a public-private key pair, cryptographic artefacts for securing a communication channel, or a combination thereof.

7. The computer-readable storage medium of claim 1, wherein:

the remote device is a smartphone, and the computing device is a device running an enterprise management system that is remotely managed by the remote device.

8. The computer-readable storage medium of claim 1, wherein generating the public-private key pair comprises:

prompting, via the management application, a user of the computing device to generate a personal identification number;

generating the cryptographic value based on the personal identification number; and sending the cryptographic value and the public-private key pair to a trusted platform module of the computing device to generate the encrypted private key.

* * * * *